US005462803A

United States Patent [19]

Wessels

[11] Patent Number: 5,462,803

[45] Date of Patent: Oct. 31, 1995

[54] DUAL LAYER FIRE-RESISTANT PLENUM CABLE

[75] Inventor: Rob Wessels, Hickory, N.C.

[73] Assignee: Comm/Scope, Catawba, N.C.

[21] Appl. No.: 65,860

[22] Filed: May 21, 1993

[51] Int. Cl.$^6$ .............................................. B32B 9/00

[52] U.S. Cl. .......................... 428/380; 428/383; 428/379

[58] Field of Search ............................ 428/379, 380, 428/383

[56] References Cited

U.S. PATENT DOCUMENTS

| | | | |
|---|---|---|---|
| 3,832,481 | 8/1974 | Boyd et al. | 174/102 R |
| 4,062,998 | 12/1977 | Hagiwara et al. | 428/380 |
| 4,079,191 | 3/1978 | Robertson et al. | 174/121 SR |
| 4,273,829 | 6/1981 | Perreault | 428/383 |
| 4,310,597 | 1/1982 | Checkland et al. | 428/383 |
| 4,430,385 | 2/1984 | Dillow et al. | 428/380 |
| 4,514,466 | 4/1985 | Leon, Jr. et al. | 428/383 |
| 4,711,811 | 12/1987 | Randa | 428/383 |
| 4,716,073 | 12/1987 | Randa | 420/215 |
| 4,801,501 | 1/1989 | Harlow | 428/383 |
| 4,963,609 | 10/1990 | Anderson et al. | 524/413 |
| 5,059,483 | 10/1991 | Lunk et al. | 428/383 |

FOREIGN PATENT DOCUMENTS 54-129381 10/1979 Japan .

*Primary Examiner*—Patrick J. Ryan
*Assistant Examiner*—Kam F. Lee
*Attorney, Agent, or Firm*—Bell, Seltzer, Park & Gibson

[57] ABSTRACT

A fire-resistant plenum-type electrical cable is provided that is insulated with an inner layer of a fluorocarbon containing polymer in contact with a surrounding electrical conductor, and an outer layer of abrasion-resistant polyvinyl chloride surrounding the inner fluorocarbon containing polymer layer. The inner layer of fluorocarbon containing polymer may be foamed.

21 Claims, 1 Drawing Sheet

DUAL LAYER FIRE-RESISTANT PLENUM CABLE

BACKGROUND OF THE INVENTION

This invention relates to a fire-resistant insulation for data and other communications cables which are typically installed within the plenum space for air ventilation in a building. More particularly, this invention relates to a fire-resistant plenum cable having a fluoropolymer inner insulation layer and an outer insulation layer of flame-retardant polyvinyl chloride.

Plenum-type cables typically include one or more twisted, insulated pairs of conductors, such as four pairs of twisted, unshielded conductors. Because of the possibility of fire and subsequent spreading of smoke within the building, conventional plenum cables incorporate flame and smoke retardant materials, particularly in the cable insulation and outer cable jacket.

Fluorocarbon polymers have been used as insulation for various electrical conductors. For example, in U.S. Pat. No. 5,059,483 there is disclosed an electrical conductor having a two-layer insulation wherein the inner layer is an ethylene/tetrafluoroethylene (ETFE) copolymer which has little or no cross-linking and the outer insulation layer of an ETFE polymer which has a relatively high degree of cross-linking. Multi-layered insulation including a layer of a fluoropolymer is also taught in U.S. Pat. No. 4,801,501 wherein there is disclosed a multi-layered insulated electrical conductor which is first covered by a layer of fluoropolymer followed by a second layer which is a thermosettable polyamide. Similarly, cable insulation layers including a fluoropolymer are taught in U.S. Pat. No. 3,832,481.

It is also known that if the polymer is foamed as it is applied to the wire, the dielectric constant is desirably lowered, due to the formation of numerous small cells. Such foamed fluorocarbon polymers are disclosed in U.S. Pat. No. 4,711,811 and U.S. Pat. No. 4,716,073.

It is also known to use polyvinyl chloride as an insulation layer in certain applications. For example, in U.S. Pat. No. 4,310,597 to Checkland there is disclosed an electrical conductor having two layers of insulation with the inner layer being a polyolefin and the outer layer being a cross-linked polyvinyl chloride. A cross-linked polyvinyl chloride insulating outer layer is also taught in U.S. Pat. No. 4,430,385 which discloses a two layer wire insulation.

It is an object of the present invention to provide an electrical cable for data and other communications transfer which includes a two-layer insulation cover having low dissipation factor and dielectric constant as well as being fire-retardant and having a tough outer layer.

Another object of this invention is to provide an electrical cable for data and other communications transfer which includes an inner layer of a fluorocarbon containing polymer and an outer layer of a polyvinyl chloride.

SUMMARY OF THE INVENTION

In accordance with the present invention, there is provided a fire-resistant plenum cable having at least one electrical conductor, an inner layer of an insulating fluorocarbon containing polymer in contact with and surrounding an electrical conductor and an outer layer of a flame-retardant polyvinyl chloride in contact with and surrounding the fluorocarbon polymer layer.

In a preferred embodiment of this invention, the inner layer is a thermoplastic fluorocarbon containing polymer. The fluorocarbon polymer comprises at least 50% by weight and preferably 75% by weight of one or more thermoplastic polymers each containing at least 25% by weight of fluorine. The fluorocarbon polymers, while being excellent insulators, are expensive and thus, it is preferable that the thickness of the inner layer be kept to a minimum. The fluorocarbon copolymer layer may, of course, include suitable additives including fillers, stabilizers, antoxidants and the like.

In another embodiment of this invention, the fluorocarbon polymer inner layer may be foamed with a dissolved gas blowing agent as it is extruded around the electrical conductor.

The outer layer is an abrasion resistant layer of plenum-rated polyvinyl chloride (PVC). The PVC layer may include additional components such as plasticizers, fire-retardant materials and the like. The polyvinyl chloride is at least 40% by weight polyvinyl chloride, preferably between about 50% and 80% by weight, with the remainder being additive components.

In manufacturing the dual layer insulation it has been found desirable to cool the outer layer as soon as it is extruded to shrink down and mechanically bond the outer polyvinyl chloride layer to the inner fluorocarbon copolymer layer.

BRIEF DESCRIPTION OF THE DRAWINGS

Other objects, features and advantages of the subject invention will become apparent from the following detailed description taken in conjunction with the drawing, in which.

DETAILED DESCRIPTION OF THE PREFERRED EMBODIMENTS

Figure 1:
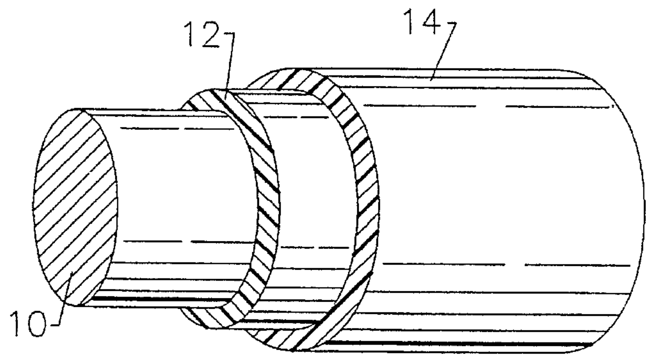
FIG. 1 is a side view illustrating a preferred embodiment of this invention.
Figure 2:
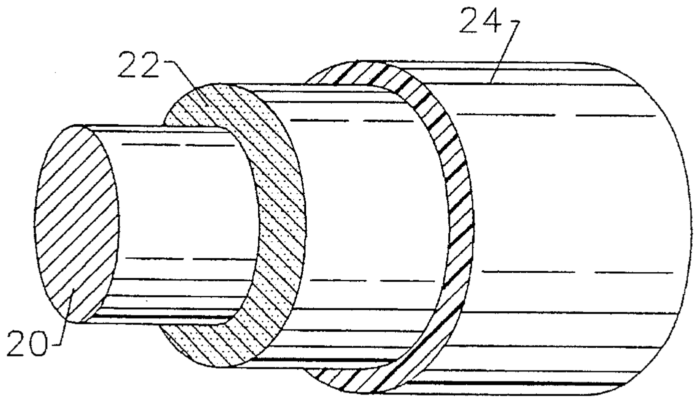
FIG. 2 is a side view illustrating the embodiment of FIG. 1 of this invention wherein the inner layer is a foam layer.

There is provided a plenum cable having a two-layer flame-resistant insulation covering an electrical conductor. Referring now to FIG. 1, there is shown an embodiment of the present invention an electrical conductor surrounded by two layers of insulation. The electrical conductor is indicated at 10, an inner layer 12, a fluorocarbon containing polymer, is shown surrounding the electrical conductor, and an outer layer 14 is an abrasion resistant and flame-resistant polyvinyl chloride polymer composition surrounding the fluorocarbon copolymer layer. In FIG. 2, there is shown another embodiment of the plenum-type cable of FIG. 1 wherein there is an electrical conductor 20, an inner layer 22 of a foamed fluorocarbon containing polymer surrounding the electrical conductor, and an outer layer 24 of an abrasion resistant polyvinyl chloride composition surrounding the foamed fluorocarbon copolymer.

The electrical conductors 10 and 20 which can be used in the present invention include any of the well known metallic conductors, such as copper, or aluminum, used in wire and cable applications, stranded or unstranded. The wire is of 26 to 20 overall AWG gauge size.

The inner layer 12 is a layer of fluorocarbon containing polymer in contact with and surrounding electrical conductor 10. The term “fluorocarbon containing polymer” is used herein to denote a polymer or mixture of polymers which contains more than 10%, preferably more than 25%, by weight of fluorine. Thus, the fluorocarbon polymer may be a mixture of two or more fluorine-containing polymers, or a mixture of one or more fluorine-containing polymers with one or more polymers which do not contain fluorine. Preferably, the fluorocarbon polymer comprises at least 50% by weight, and preferably at least 75%, especially at least 85%, by weight of one or more thermoplastic crystalline polymers each containing at least 25% by weight of fluorine. The fluorocarbon containing polymers are generally homo-or copolymers of one or more fluorine-containing olefinically unsaturated monomers, or copolymers of one or more such monomers with one or more olefins. Preferred polymers are perfluorinated. The fluorocarbon polymer has a melting point of at least 200° C., and will often have a melting point of at least 250° C., e.g. up to 300° C. Preferably the polymeric composition has a viscosity of less than $10^5$ poise at a temperature not more than 60° C. above its melting point.

A preferred fluorocarbon polymer is a copolymer of ethylene and tetrafluoroethylene and optionally one or more other comonomers, especially a copolymer comprising 35 to 60 mole percent of ethylene, 35 to 60 mole percent of tetrafluoroethylene and up to 10 mole percent of one or more other comonomers. Especially preferred are a perfluoroalkoxy (PFA) resin, an ethylene-tetrafluoroethylene (ETFE) resin, or a fluorinated ethylene-propylene (FEP) resin (commercially available under the trade name TEFLON from DuPont). Other specific polymers which can be used including copolymers of ethylene and chlorotrifluoroethylene (commercially available under the trade name HALAR from Allied Chemical Co.); copolymers of vinylidene fluoride with one or both of hexafluoropropylene and tetrafluoroethylene, or with hexafluoroisobutylene; and copolymers of tetrafluoroethylene and hexafluoropropylene.

The polymeric composition can optionally contain suitable additives such as pigments, antioxidants, thermal stabilizers, acid acceptors and processing aids. When, as is preferred, the polymeric composition is electrically insulating, any conductive fillers which are present should be used in small amounts which do not render the composition conductive. The fluorocarbon polymer is extruded or coated over the electrical conductor by conventional wire covering equipment and techniques. The inner layer is between about 2.0 mils and about 10.0 mils thick.

In the alternative embodiment shown in FIG. 2, the fluorocarbon copolymer is foamed. Any liquid or gaseous foaming agent may be used to promote foam formation of the fluoropolymer. The foamed inner layer may be between about 4.0 mils and about 40 mils thick. The foam provides a low dielectric constant. The outer layer is not foamed and has a high dielectric constant, but the layer does not significantly shift the mutual capacitance properties as measured between pairs in the cable assembly.

The inner layer of fluorocarbon containing polymer, especially when a foam is used, does not provide by itself the mechanical strength needed for plenum cable. Thus, an outer abrasion-resistant, flame-resistant layer in contact with and surrounding the fluorocarbon layer is provided.

The outer layer 14 is a plenum-rated polyvinyl chloride (PVC). Plenum-rated PVC comprises polyvinyl chloride and a plasticizer. An example of a plenum-rated commercially available polyvinyl chloride is Apex 910 available from Teknor. Lead salts, for example, tetrabasic lead fumarate, can be included as a stabilizer and finely divided calcium carbonate can be included as a filler. A fire-retardant material, such as antimony trioxide, can also be included. The outer layer is formed using conventional dry blending, pellet manufacture, or extrusion. The actual range of the various constituents of the PVC compound can vary, but the PVC content is at least 40% by weight of the total layer, but preferably between about 50% and about 80% by weight. The plasticizer may be, for example, trioctyl trimaletate or dioctyl phthalate in amounts from 5% by weight to about 20% by weight.

The outer PVC layer has a thickness of about 2.0 mils to about 10 mils and can be extruded or coated onto the wire in a conventional manner. The outer layer of polyvinyl chloride offers sufficient abrasion resistant in usage for the requirements of plenum-type cable without cross-linking. The combination of these two layers as insulation for an electrical cable is unique.

In manufacturing the two layers of insulation, it has been found desirable to cool or quench the outer layer as soon as it is extruded to shrink down and mechanically bond the PVC outer layer to the fluorocarbon copolymer inner layer. The wires thus insulated may be easily formed into twisted pairs and into jacketed cable comprising a plurality of such coated pairs.

EXAMPLE

A 24 AWG solid bare copper wire was insulated by melt coating over the wire an inner insulating layer 0.004 inches thick of DuPont FEP 3100 polymer (fluorinated ethylene-propylene), and an outer layer 0.004 inches thick of Apex 910 plenum rated polyvinyl chloride from Teknor. A cable of 4 twisted pairs of the insulated wires was formed and an outer jacket of Apex 910 plenum PVC of 0.170 inch diameter was formed. Cable of this construction was found to meet TIA/EIA category 4 standards for data transmission up to 20 MHZ.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A fire-resistant plenum cable having only two insulating layers, said cable comprising:

at least one electrical conductor;

an inner layer of a fluorocarbon copolymer containing polymer in contact with and surrounding said electrical conductor; and an outer layer in contact with and surrounding said fluorocarbon copolymer layer, said outer layer being a layer of one abrasion resistant and flame-resistant polyvinyl chloride.

2. The insulated, fire-resistant, plenum-type electrical cable according to claim 1 wherein said fluorocarbon containing polymer inner layer is a melt-processible perfluorinated copolymer of a tetrafluoroethylene.

3. The insulated, fire-resistant, plenum-type electrical cable according to claim 1 wherein said fluorocarbon containing polymer is selected from the group consisting of an ethylene-tetrafluoroethylene, a fluorinated ethylene-propylene, and a perfluoroalkoxy polymer.

4. The insulated, fire-resistant, plenum-type electrical cable according to claim 2 wherein said inner layer is between about 2.0 mils and about 10.0 mils thick.

5. The insulated, fire-resistant, plenum-type electrical cable according to claim 1 wherein said fluorocarbon containing polymer inner layer is a melt-processible fluorocarbon polymer foam.

6. The insulated, fire-resistant, plenum-type electrical cable according to claim 5 wherein said fluorocarbon polymer is selected from the group consisting of an ethylene-tetrafluoroethylene, a fluorinated ethylene-propylene, and a perfluoroalkoxy polymer.

7. The insulated, fire-resistant, plenum-type electrical cable according to claim 6 wherein said foam inner layer is between about 4.0 mils and about 40 mils thick.

8. The insulated, fire-resistant, plenum-type electrical cable according to claim 1 wherein said polyvinyl chloride outer layer comprises polyvinyl chloride and a plasticizer, said polyvinylchloride content being at least about 40% by weight of the outer layer.

9. The insulated, fire-resistant, plenum-type electrical cable according to claim 5 wherein said polyvinyl chloride outer layer comprises polyvinyl chloride and a plasticizer, said polyvinylchloride content being at least about 40% by weight of the outer layer.

10. The insulated, fire-resistant, plenum-type electrical cable according to claim 1 wherein said outer layer is between about 2.0 mils and 10 mils thick.

11. The insulated, fire-resistant, plenum-type electrical cable according to claim 1 wherein said cable is solid or stranded copper wire of 26 to 20 AWG gauge size.

12. A fire resistant, plenum cable having only two insulating layers, said cable comprising:

at least one electrical conductor of 26 to 20 AWG gauge size;

an inner layer of fluorocarbon containing polymer selected from the group consisting of fluorinated ethylene-propylene (FEP), polytetrafluoroethylene (PTFE), ethylene-tetrafluoroethylene (ETFE), and ethylene-chlorotrifluoroethylene (ECTFE) in contact with and surrounding said electrical conductor; and an outer layer containing polymer layer, said single outer layer comprising polyvinyl chloride and a plasticizer, wherein said polyvinyl chloride content is between about 50% and about 80% by weight of the outer layer.

13. The insulated, fire-resistant, plenum-type electrical cable according to claim 12 wherein said inner layer of fluorocarbon containing polymer is between about 2.0 mils and about 10.0 mils thick.

14. The insulated, fire-resistant, plenum-type electrical cable according to claim 12 wherein said inner layer of fluorocarbon containing polymer is a melt-processible fluorocarbon foam.

15. The insulated, fire-resistant, plenum-type electrical cable according to claim 14 wherein said inner layer of fluorocarbon containing polymer foam is between about 4.0 mils and about 40 mils thick.

16. The insulated, fire-resistant, plenum-type electrical cable according to claim 12 wherein said outer layer is from about 2.0 mils to about 10 mils thick.

17. The insulated, fire-resistant, plenum-type electrical cable according to claim 12 wherein said outer polyvinyl chloride layer includes a fire-retardant material.

18. The insulated, fire-resistant, plenum-type electrical cable according to claim 12 wherein said outer polyvinyl chloride layer includes a filler.

19. Pairs of twisted cables defined in claim 1.

20. An insulated, fire-resistant plenum cable consisting essentially of:

at least one electrical conductor;

an inner layer between about 2.0 mils and about 10.0 mils thick of a fluorocarbon copolymer containing polymer in contact with and surrounding said electrical conductor, said fluorocarbon containing polymer being selected from the group consisting of fluorinated ethylene propylene (FEP), polytetrafluoroethylene (PTFE), ethylene-tetrafluoroethylene (ETFE), and ethylene-chlorotrifluoroethylene (ECTFE); and a single outer layer of one abrasion resistant and flame-resistant polyvinyl chloride, wherein said polyvinyl chloride content is between about 50% and about 80% by weight of the outer layer between about 2.0 mils and 10 mils thick in contact with and surrounding said fluorocarbon copolymer layer.

21. An insulated, fire-resistant plenum cable consisting essentially of:

at least one electrical conductor;

an inner layer between about 4.0 mils and about 40.0 mils thick of a fluorocarbon foam copolymer containing polymer in contact with and surrounding said electrical conductor, said fluorocarbon containing polymer being selected from the group consisting of fluorinated ethylene propylene (FEP), polytetrafluoroethylene (PTFE), ethylene-tetrafluoroethylene (ETFE), and ethylene-chlorotrifluoroethylene (ECTFE); and an outer layer of one abrasion resistant and flame-resistant polyvinyl chloride, wherein said polyvinyl chloride content is between about 50% and about 80% by weight of the outer layer between about 2.0 mils and 10 mils thick in contact with and surrounding said fluorocarbon copolymer layer.

* * * * *